June 19, 1923.

E. SAUNDRY

ROPE JOINING CLAMP

Filed Oct. 6, 1922

1,459,265

Inventor,

Edward Saundry,

By F. Amos Johnson
Atty.

Patented June 19, 1923.

1,459,265

UNITED STATES PATENT OFFICE.

EDWARD SAUNDRY, OF NEW HAVEN, CONNECTICUT.

ROPE-JOINING CLAMP.

Application filed October 6, 1922. Serial No. 592,699.

*To all whom it may concern:*

Be it known that I, EDWARD SAUNDRY, a citizen of the United States, and a resident of New Haven, in the county of New Haven and State of Connecticut, have invented a new and useful Rope-Joining Clamp, of which the following is a specification.

My invention relates to clamps for fastening together two ropes, as a substitute for tying, and is usable wherever it is necessary to join together two ends of a rope, cord or other line and put the line under tension. It is especially useful in putting up and stretching a clothes line; or in any place where it is desirable to hold the line to any point to which it may be stretched and where a ready release is also of advantage. The object of my invention is to cheapen the cost of manufacture and to increase its effectiveness over devices of similar nature which are now in use.

Figure 1:
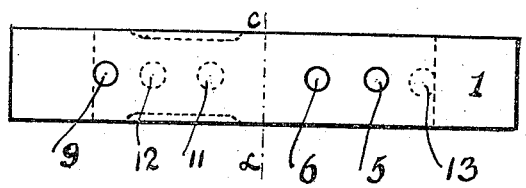
Figure 2:
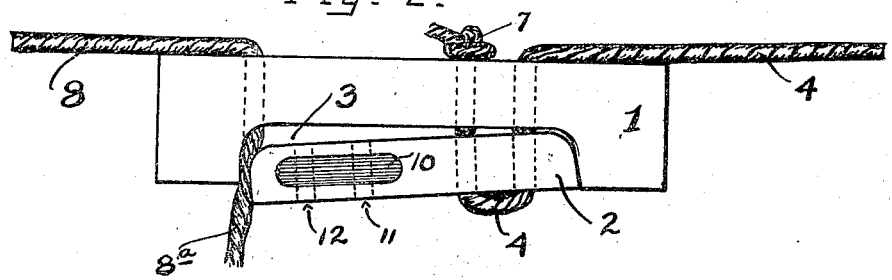
Figure 3:
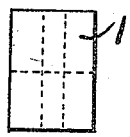
Figure 4:
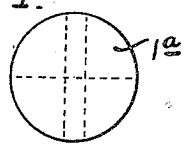

In the detailed description which follows, reference is made to the accompanying sheet of drawings, in which: Figure 1 is a plan; Fig. 2, a side elevation and Fig. 3 an end view. Figure 4 is an end view showing a clamp having a different shape in cross section and Fig. 5 is a side elevation of a portion of a clamp showing a different means of attaching one of the ropes or cords.

The clamp is composed of two members, 1 and 2, of unequal length—the shorter one, 2, being recessed or set into the side of the longer member. In manufacture these clamps are made of wood—hard maple being well adapted for the purpose—and the shorter member is sawed out of the side of the longer member by a band saw, forming a recess, 3, in the longer member. While it is preferable to make the clamps from blocks of wood which are rectangular in cross section, other shapes may be used as, for instance, a round block, shown in Fig. 4, 1ᵃ.

The shorter member is held in place in the recess in the longer member by one of the ropes, 4, the end of which is passed twice through both clamping members (transverse perforations 5 and 6 being made for this purpose), the end of the rope being secured to the longer member by a knot 7. This forms a hinge and clamping device, holding the two members together by a force substantially double the tension which is placed on the line 4.

Figure 5:
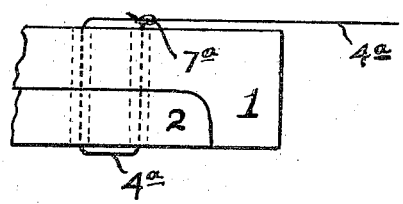

In Fig. 5 I have shown the rope 4ᵃ passing twice through both members and secured to itself by a knot 7ᵃ. While this construction holds the members together and serves as a hinge, the clamping power is only one-half as much as in the construction shown in Fig. 2.

The other rope, 8, is passed through a transverse perforation 9, in the longer member, in such a position that the rope comes into the recess close to one end, in which position it will be clamped against one end of the recess by the shorter member when that member is drawn into the recess by tension on the line 4, as already pointed out.

By pulling on the free end, 8ᵃ, of the rope 8, any desired tension may be obtained on the line, the swinging and locking member, 2, acting as a friction retaining pawl to hold the rope to whatever position it may be drawn.

To release the tension on the line the member 2 is drawn out of the recess. To facilitate this movement, grooves, 10, may be formed in the sides of the member 2.

In Figs. 1 and 2 I have shown by dotted lines two additional holes or perforations, 11 and 12, in the member 2. This shorter member may be turned end for end in the recess 3, in which case the holes 11 and 12 will align with the holes 5 and 6 of the member 1, thereby permitting the shorter member to be reversed to bring a new end into position to do the clamping, when one end becomes worn.

By placing the holes 5 and 6 so they are the same distance each side of the center line C—L, the same reversal of member 2 may be accomplished, without making any extra holes in the piece.

By extending the holes or perforations 11 and 12 through the member 1 and by putting an extra hole through the member 1 at the point 13 (Fig. 1), the two lines 4 and 8 may be reversed and the opposite end of the clamp used to do the holding, thereby doubling the life of the clamp.

I claim:

1. In a rope-joining clamp, the combination of the following elements, to-wit: two clamping members of unequal length—the longer member being provided with a recess in its side, which is adapted to receive the shorter member—said shorter member being adapted to clamp one end of a rope against one end of said recess; a perforation in the longer member which is adapted to receive said rope to guide it into clamping position;

a hinge and clamping element formed by the other rope to be joined—said rope passing twice through both of said clamping members whereby, on putting said rope under tension, said shorter member is firmly drawn into said recess to clamp the opposite end of said rope.

2. A rope-joining clamp comprising two members of unequal length—the shorter member being set into a recess in the side of the longer member, in combination with a hinge and clamping element formed by one of the ropes to be joined—said rope being secured to one of said members and passing twice through both members whereby, on putting said rope under tension, said members are drawn together by a force greater than the tension on said rope.

3. A rope-joining clamp comprising two members of unequal length—the shorter member being set into a recess in the side of the longer member—said shorter member being reversible in said recess, in combination with means controlled by the tension on the line, for drawing said shorter member into said recess by a force greater than the tension on the line.

4. A rope-joining clamp formed from a piece of wood of rectangular cross section, comprising two members of unequal length, the shorter member being sawed out of the side of the longer member; a transverse perforation through said longer member into said recess and adjacent to one end of said recess; and a pair of transverse perforations through both of said members—said single perforation in said longer member being adapted to receive one of the ropes to be joined to guide said rope into clamping position and said double perforations being adapted to receive the other rope to be joined and to draw the two clamping members together when tension is applied to said rope.

In testimony whereof I affix my signature.
EDWARD SAUNDRY.

Witness:
ELEANORE EICHMANN.